United States Patent [19]

Niskin

[11] 4,307,605
[45] Dec. 29, 1981

[54] CURRENT METER

[76] Inventor: Shale J. Niskin, 3415 Chase Ave., Miami Beach, Fla. 33140

[21] Appl. No.: 145,893

[22] Filed: May 2, 1980

[51] Int. Cl.³ .................. G01F 15/18; G01W 1/00
[52] U.S. Cl. .................................... 73/170 A; 73/188
[58] Field of Search ............... 73/170 A, 170 R, 188, 73/189, 228; 9/8 R; 114/230

[56] References Cited

U.S. PATENT DOCUMENTS

| | | | |
|---|---|---|---|
| 2,850,896 | 9/1958 | SeLegue et al. | 73/188 |
| 3,327,968 | 6/1967 | Converse | 73/170 A X |
| 3,371,529 | 3/1968 | Tillman | 73/188 |
| 3,372,585 | 3/1968 | Niskin | 73/170 A |
| 3,906,790 | 9/1975 | Brainard et al. | 73/170 A |
| 3,971,251 | 7/1976 | Niskin | 73/170 A |
| 4,091,666 | 5/1978 | Niskin | 73/170 A |

OTHER PUBLICATIONS

Publication, "Niskin Winged Current Meter", Model 6011, General Oceanics Bulletin No. 801-1078, filed Jun. 23, 1980.
Publication, "Underwater Film Recording Instruments", General Oceanics Bulletin No. 902-279, filed Jun. 23, 1980.

Primary Examiner—Daniel M. Yasich
Attorney, Agent, or Firm—William A. Newton

[57] ABSTRACT

Disclosed is an elongated housing containing a current meter for determining the velocity and direction of a current in a body of water, wherein the housing has a plurality of fins for flow stability and a connecting member joins the housing to a standoff framework, which in turn is fastened to an anchored line in the body of water.

2 Claims, 4 Drawing Figures

CURRENT METER

FIELD OF THE INVENTION

The present invention is related to current meters for determining the direction and velocity of a current in a body of water.

DESCRIPTION OF THE PRIOR ART

The use of current flow meters for determining the current's velocity and direction in a body of water is well known. These current meters generally have cylindrical housings, with an inclinometer mounted therein. As shown in U.S. Pat. No. 4,091,666 to Niskin, the applicant in the present invention, a pair of appendages or fins can be mounted at right angles to each other so as to decrease the orbital and sideway swaying of the cylindrical housing and the jerky vertical movement of the same caused by the rise and fall of the waves. In this design, the cylindrical housing is connected to a standoff framework by means of a swivelled connector. In addition, the standoff framework can rotate about an anchored line to which it is fastened. Typically, the anchored line has a float connected at one end and a weighted anchor connected at the other end. Hence, the prior art device responds to a change in current direction by pivoting downstream about the anchored line and also rotates about the longitudinal axis of the cylindrical housing. The rotation of the cylindrical housing about its axis is primarily a function of fins swinging into the new direction of the current. Also, the force of the current will cause the cylindrical housing to be positioned in the plane of the water flow at an angle determined by the velocity of the current.

Generally, there are two forces which are imparted to the anchored line. First, there is a pulsating vertical force caused by the bobbing of the float with the rise and fall of the waves. There is also the horizontal force of the current flow. These forces combine to create a lateral fluttering movement of the anchored line along its full length. At the position whereat the current meter is mounted, the anchored line may sway back and forth in a lateral displacement of, for example, five yards. The fins of the heretofore mentioned device of U.S. Pat. No. 4,091,666 prevents the cylindrical housing from fluttering from side to side as would occur if no fins were on the housing.

Despite the improvement of patent 4,091,666 there remains a few inherent disadvantages in this prior art device. The velocity of the vertical displacement of the anchored line, as caused by the previously described fluttering, normally exceeds the velocity of the current. Hence, the current meter, due to the line motion, moves in a lateral direction, reverses itself, and then comes back in substantially the opposite direction. Consequently, the current meter will, by means of its swivelled connection, rotate more or less by a 180° when it reverses direction. Hence, the velocity of the vertical displacement and the velocity of the current results in an apparent velocity and direction that differs substantially from the actual current velocity and direction. It is necessary to mathematically deconvolve the actual current velocity and direction. The sensors of the current meter are very slow to respond to this orbital and rotational motion of the cylindrical housing about its axis. Consequently, much more elaborate calibrations are required, and more inaccurate readings are obtained, due to the slow response time of the sensors to the orbiting motion.

Another disadvantage of the device of U.S. Pat. No. 4,091,666 is that it requires the swivel connection of the housing to be operable. It has been discovered that grit and other jamming material can get into the swivel connection and prevent proper rotation of the current meter into the current.

Other relevant types of current meters are shown in Product Bulletin Nos. 801–1078 and 902–279 of General Oceanics, Inc. of Miami, Fla. These current meters, which are the same or similar to that of U.S. Pat. No. 4,091,666 have wings for flow stability.

SUMMARY OF THE INVENTION

The present invention is directed to an elongated housing containing a current meter for determining the velocity and direction of a current in a body of water. The housing has at least three radially aligned, equally spaced fins mounted thereon to provide uniform flow stability for any current direction. Connecting means are used for mounting one end of the housing to a standoff framework, which in turn is fastened to an anchored line in the body of water. The connecting means comprises a bar which is rigidly attached to the housing at one end and terminates in a roller at the other end. Consequently, the housing is prevented from rotating about its longitudinal axis.

By virtue of the improvement of the present invention, rotation of the housing during its reversal in directions, caused by the fluttering effect of the anchored line, are eliminated. No matter what the direction of the apparent current, for a given magnitude of the apparent current, the housing provides the same drag. This is due to the number of and the position of the fins. Hence, unlike the prior art housing, there is no rotation of the housing about its longitudinal axis, which causes inaccurate sensor readings and recorded data requiring complex mathematics to extract the true current direction and velocity. Moreover, the swivel connections of the prior art housings are not needed; hence, a source of mechanical unreliability is eliminated.

BRIEF DESCRIPTION OF THE DRAWINGS

Further objects and advantages of the present invention will become apparent as the following description proceeds, taken in conjunction with the accompanying drawings in which.

DESCRIPTION OF THE PREFERRED EMBODIMENT

Figure 1:
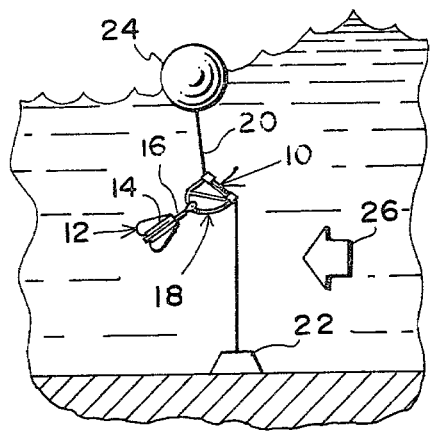
FIG. 1 is a plan view of the current meter arrangement of the invention positioned in its operating environment.

Referring to FIG. 1, a current flow meter arrangement 10 is shown with a current meter 12 having an elongated cylindrical housing 14 joined by a connecting means 16 to a standoff framework 18, which in turn is fastened to an anchored line 20. The anchored line 20 has a weighted anchor 22 connected at one end, which rests on the bottom of the body of water. On the other end, the anchored line 20 has attached thereto a float 24, so as to maintain the line 20 in a substantially vertical position. The current meter 12, with its standoff framework 18, is secured to the line 20 at a depth whereat it is desirable to measure the velocity and direction of the current flow in the body of water. The current flow is shown by arrow 26. As will be described in detail hereinafter, the present invention comprises providing the housing 14 with at least 3, and preferably 4 or more, equally spaced appendages of fins 28.

Figure 2:
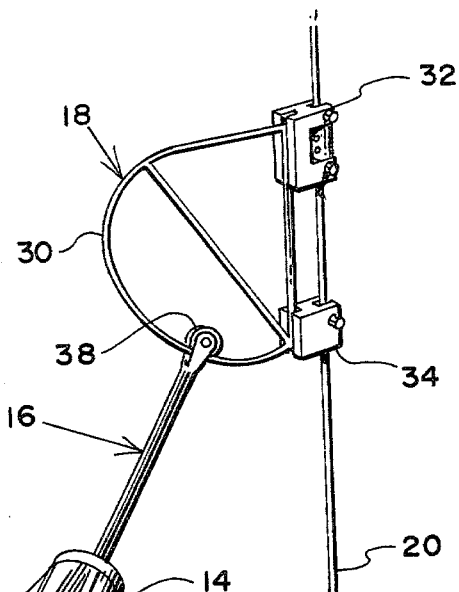
FIG. 2 is a perspective view of the current meter arrangement.
Figure 4:
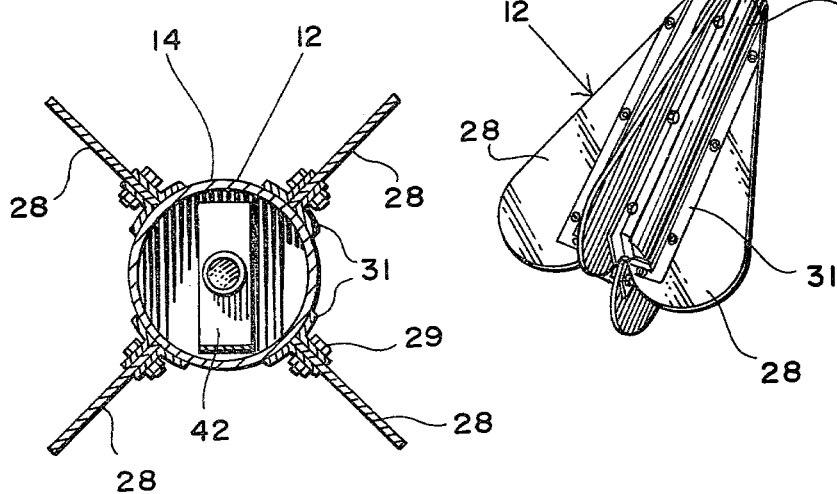
FIG. 4 is a cross-sectional view of the current meter taken with respect to section line 4—4 in FIG. 3.
Figure 3:
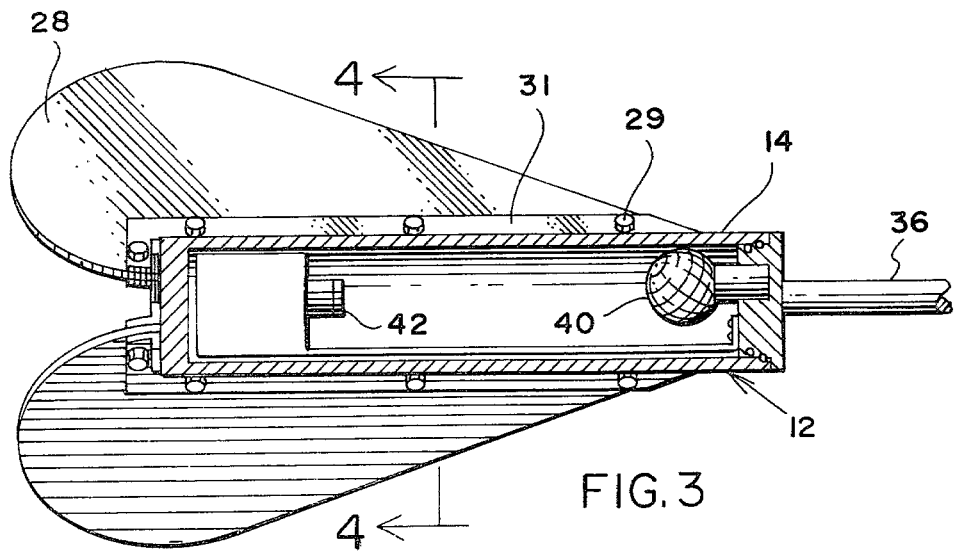
FIG. 3 is a cross-sectional view of the current meter taken with respect to section line 3—3 in FIG. 2.

As shown in FIGS. 2,3 and particularly 4, preferably four fins 28 are mounted in equally spaced relationship about the housing 14. Ideally, the fins have a tear drop configuration. Although the enlarged end of the tear drop configuration is shown positioned at the lower end of the housing 14, it can be inverted. Moreover, the fin 28 need not provide a solid plane, but can have cutouts formed therein, as desired. Preferably, each fin 28 is secured by fastening means 29, in the form of a nut and bolt combination, to a bracket 31, which is rigidly fixed to the cylindrical housing 14. The fins 28 extend radially outward with respect to the longitudinal axis of the housing 14. In the illustrated embodiment, each fin 28 has an angular disposition that is 90° from the adjacent fin 28. It has been found that four, equally spaced fins 28 are the preferred number of fins. However, three equally spaced fins 28 will work, but does not quite provide the stability of four fins 28. Moreover, more than four equally spaced fins 28 works as well as just four fins, but since no significant improvement is obtained by the added fins 28, more than four fins 28 are not cost effective. The housing 14, although preferably cylindrical in cross section, can assume other shapes, such as, for example, a rectangular shape.

Referring to FIG. 2, the standoff framework 18 is of conventional design and is used to allow the current meter 12 to assume the correct angle to the current, even when the anchored line 20 is not vertical. The standoff framework 18 can vary in design, but generally comprises a curved rod 30 with a pair of traveling blocks 32 and 34 that allow the framework 18 to be clamped on the anchored line 20. Preferably, but not necessarily, the traveling blocks 32 and 34 allow the framework 18 to freely rotate about the anchored line 20. The standoff framework 18 is of conventional design as shown by U.S. Pat. No. 4,091,666.

The cylindrical housing 14 is connected to the framework 18 by the connecting means 16. The connecting means 16 comprises a rigid rod 36 which is rigidly secured at one end to the housing 14 and at the other end to a roller means or pulley 38. Although it is preferable that the standoff framework 18 be able to rotate about the anchored line 20, such rotation is not necessary, as long as the roller 38 allows the housing to be pivoted in three dimensions. The specific construction of the standoff framework 18 per se is not part of the invention and any suitable standoff arrangement can be used. For example, another commercially available standoff framework 18 comprises a framework rotatably mounted to the anchor line in a manner that prevents slippage along the line. A mounting bar is provided at the end of the framework, with a loop replacing the pulley 38 and being disposed around the mounting bar. The loop can then be rigidly attached to the housing 14, unlike the prior art's swivel attachment.

Referring to FIG. 3, components of the current meter 12, which are inside of the housing 14, can take numerous conventional arrangements, such as those shown in the U.S. Pat. Nos. 4,091,666 and 3,372,585, both to Niskin. For example, the current meter 12 typically comprises an inclinometer 40 which includes two concentric spheres, one being a moveable inner sphere and the other being a transparent, fixed, outer sphere. Normally, a recording camera 42 photographs the relative position of the outer transparent sphere. Inclination and azimuth are read directly from the film of the camera 42. More specifically, the inclinometer 40 provides two readings for every position of the housing 14, one reading being a compass bearing indicating the direction of the current and the other reading being an angular position or tilt indicating the velocity of the water current. Another commercially available flow meter 12 usable with the present invention comprises a force balance inclinometer to determine tilt and three orthongonally mounted Hall effect sensors for compass direction. Tilt data from the inclinometer provides information concerning current speed. The Hall effect sensors provide compass direction which is typically recorded on a cassette tape as three vector components of the earth's magnetic field.

In operation, the current meter 12 provides data on current velocity and directional flow at a desired depth of a body of water. The framework 18 is fastened to the anchored cable 20 at the proper distance from the anchor 22. The force of the current will cause the cylindrical housing 14 to lie in the plane of the water flow at an angle determined by the velocity of the flow. Any vertical bobbing action of the float 24 causes the pulley 38 to ride up and down the curved rod 30 without affecting the angular position of the housing 14, thereby maintaining an accurate determination of velocity. The connecting means 16 prevents any rotation of the housing 14 about its longitudinal axis. More importantly, no rotation is necessary, since the equally spaced fins 28 provide substantially the same drag to given magnitude of apparent current, no matter from which direction the current impinges upon the current meter 12. Hence, the swivel action of the prior art arrangements is eliminated. If the framework 18 is mounted to the anchored line 20 so as to rotate around the same, then framework 18 will tend to rotate into the direction of the apparent current. However, the framework 18 can be securely attached to the anchored line 20, leaving all the rotational motion being primarily that of the pulley 38 about the curved rod 30.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. In an elongated housing having a longitudinal axis and containing a current meter with an inclinometer for determining the velocity and direction of a flow current in a body of water, the improvement comprising:

a plurality of fins comprising at least three said fins mounted on said housing in substantially equally spaced relationship with respect to each other to provide spacial stability and orientation for said elongated housing so as to allow for the determination of the velocity and direction of the flow current without rotation of said elongated housing about said longitudinal axis;

each said fin being disposed in a plane which substantially intersects said longitudinal axis of said housing;

each said fin having a tear drop configuration;

connecting means, mounted at one end of said housing, for pivotally anchoring said housing in said body of water;

said connecting means comprising roller means and a rod rigidly connected at one end to said end of said housing and rigidly connected at the other end to said roller means to provide a non-swiveling connection which is not subject to jamming;

a standoff framework having fastening means for securing said standoff framework to a substantially vertically disposed anchored line in said body of water;

said standoff framework having a curved member, said roller means being rotatably mounted on said curved member.

2. The structure of claim 1, wherein said plurality of fins comprises at least four said fins, each said fin being disposed substantially at right angles with respect to each adjacent said fin.

* * * * *